(12) United States Patent
Melman

(10) Patent No.: US 11,567,566 B2
(45) Date of Patent: Jan. 31, 2023

(54) DEVICES AND METHODS FOR MONITORING GAZE

(71) Applicant: CONTROLRAD SYSTEMS INC., Radnor, PA (US)

(72) Inventor: Haim Zvi Melman, Kfar Saba (IL)

(73) Assignee: CONTROLRAD SYSTEMS, INC., Peachtree Corners, GA (US)

( * ) Notice: Subject to any disclaimer, the term of this patent is extended or adjusted under 35 U.S.C. 154(b) by 892 days.

(21) Appl. No.: 15/564,251

(22) PCT Filed: Apr. 7, 2016

(86) PCT No.: PCT/IB2016/051979
§ 371 (c)(1),
(2) Date: Oct. 4, 2017

(87) PCT Pub. No.: WO2016/162822
PCT Pub. Date: Oct. 13, 2016

(65) Prior Publication Data
US 2018/0129279 A1    May 10, 2018

Related U.S. Application Data

(60) Provisional application No. 62/144,358, filed on Apr. 8, 2015.

(51) Int. Cl.
*G06F 3/01* (2006.01)
*G06F 3/03* (2006.01)
(Continued)

(52) U.S. Cl.
CPC ........... *G06F 3/013* (2013.01); *G06F 3/0304* (2013.01); *G06F 3/0308* (2013.01);
(Continued)

(58) Field of Classification Search
CPC ...... G06F 3/013; G06F 3/0304; G06F 3/0308; G06F 3/0312; G06F 3/0325; G06K 9/00604; G06K 9/0061
See application file for complete search history.

(56) References Cited

U.S. PATENT DOCUMENTS

| 8,077,914 B1 | 12/2011 | Arkady |
| 2010/0328444 A1* | 12/2010 | Blixt ............... A61B 3/113 348/78 |

(Continued)

FOREIGN PATENT DOCUMENTS

WO    8806859 A1    9/1988

OTHER PUBLICATIONS

International Search Report in PCT/IB2016/051979 dated Jul. 28, 2016.

*Primary Examiner* — Afroza Chowdhury
(74) *Attorney, Agent, or Firm* — Manelli Selter PLLC; Edward Stemberger

(57) ABSTRACT

A gaze monitoring system comprising: an eye tracker comprising; a camera having an optical axis; a first IR source configured to illuminate a user's eyes; the first IR source located relatively near the optical axis of the camera; and at least one second IR source configured to illuminate the user's eyes, the at least one second IR source located relatively far from the camera's optical axis, in a position such that when the gaze angle is too large to get corneal reflection images of the first IR source, the image reflection of the at least one second IR source is visible by the camera, as a corneal reflection.

9 Claims, 9 Drawing Sheets

(51) Int. Cl.
*G06V 40/19* (2022.01)
*G06V 40/18* (2022.01)

(52) U.S. Cl.
CPC .......... *G06F 3/0312* (2013.01); *G06F 3/0325* (2013.01); *G06V 40/19* (2022.01); *G06V 40/193* (2022.01)

(56) References Cited

U.S. PATENT DOCUMENTS

| | | |
|---|---|---|
| 2011/0170061 A1 | 7/2011 | Gordon |
| 2013/0002846 A1 | 1/2013 | De Bruijn et al. |
| 2013/0063340 A1 | 3/2013 | Mondragon et al. |
| 2013/0156742 A1 | 6/2013 | Larkin et al. |
| 2015/0160725 A1* | 6/2015 | Lee .................. G06F 3/013 348/78 |
| 2015/0309568 A1* | 10/2015 | Miki .................. G06F 3/013 345/173 |

* cited by examiner

DEVICES AND METHODS FOR MONITORING GAZE

TECHNOLOGY FIELD

The present invention relates to eye trackers and more particularly to monitoring of gaze at large gaze angles.

BACKGROUND

Eye trackers (ET) are used for various applications such as market research, software application usability evaluation and communication tool for disabled people. In many of the applications eye trackers are used in a configuration where the ET is attached to the bottom part of a display and is used to track the gazing point of the user on the display. Examples of such eye trackers are EyeX available from Tobii AB, Danderyd, Sweden and RED250 available from SensoMotoric Instruments GmbH (SMI), Teltow, GERMANY. Such eye trackers typically include one or two cameras and infrared light sources (IR). The IRs are typically located near the optical axis of the camera, sometimes on the optical axis. The IRs are used both to illuminate the eyes and the face of the user to enable the identification of the pupils of the user and also enable the reflection of these IR light source from the cornea, thus, providing an image of the IR light source within the region of the cornea (this is the reflection from the outer surface of the cornea also known as first Purkinje image) in the received images and termed here also "corneal reflection". Algorithms analyze the relations between the corneal reflection and the pupil to determine the gaze angle and thus, the gaze point on the display. The display information and a calibration process where during which the user looks at a few calibration points on the display provide the algorithms with the specific information required for an accurate evaluation of the gaze point on the display.

Two illumination approaches are common with such eye trackers: bright pupil and dark pupil. For bright pupil the IR is located as close as possible to the optical axis of the camera, so as to get a red-eye effect, where the pupil appears bright in the image. This technique is useful for bright pupil detection algorithms but corneal reflection of the IR within the bright pupil image, makes the corneal reflection image harder to detect and process. Dark pupil is achieves by moving the IR just far enough from the optical axis to avoid the red-eye effect and get a pupil image that is relatively dark, making the detection and processing of a corneal reflection image that is in the pupil, much easier. In any case the motivation to keep the IR as near as possible to the optical axis is maintained so as to minimize the dimensions of the eye tracking device.

The range of gaze angles that can be monitored is limited by the requirement for the IR reflection image to be within the cornea region. This is because the cornea surface provides good optical characteristics for a specular reflection resulting in a good reflection image of the IR illumination. If the gaze angle of the eye is such that the position of the eye area participating in reflection of the IR light to the camera is outside the cornea region, the sclera, the image of the IR will become degraded and difficult for detection from the camera image and thus difficult to use for eye tracking. Therefore, as a result of the structure of the human eye, this limits that gaze angle that can be monitored by such eye trackers to 35-40 degrees from the eye tracker.

SUMMARY

According to one example of the present invention there is provided an ET with IR near or at the optical axis of the ET camera or more than one IR, at least one near the optical axis and at least one on the optical axis of the ET camera. In addition at least one remote IR is provided to illuminate the user's eyes, wherein this IR is relatively far from the camera optical axis, located in a position such that when the gaze angle is too large to get a corneal reflection images of the near axis IR, the image reflection of the remote IR is visible by the camera in the cornea, as a corneal reflection.

According to another example of the present invention, the remote IR is located at a distance from the optical axis of the camera, in direction where it is desired to support large gaze angles.

According to an additional example of the invention, a method is disclosed to design the position of the IRs according to the desired increase in gaze range (angle and direction) that can be monitored.

According to yet another example of the invention, a plurality of remote IRs are positioned in different locations so as to extend the gaze angles that can be monitored in more than one direction.

According to an additional example of the invention, remote IRs are mounted on the display or other objects that are not the ET.

According to another example of the invention, the different IRs are distinguished by any of the modulation of at least part of the IRs or by relative geometrical arrangement of at least a part of the IRs.

According to yet another example of the invention, the calibration process of the device of the present invention is made for at least two IRs, each IR for at least a part of the gaze angles it covers.

According to yet another example of the invention, the IR for each gaze angle is selected so as to get the reflection image to be as close as possible to a desired location within the eye image.

According to yet another example of the present invention, more than one IR are used to evaluate gaze angle, in a first example of the invention simultaneously, in a second example of the invention successively, one after the other and in a third example, both simultaneously and successively.

According to an aspect of the present invention there is provided a gaze monitoring system comprising: an eye tracker comprising; a camera having an optical axis; a first IR source configured to illuminate a user's eyes; the first IR source located relatively near the optical axis of the camera; and at least one second IR source configured to illuminate the user's eyes, the at least one second IR source located relatively far from the camera's optical axis, in a position such that when the gaze angle is too large to get corneal reflection images of the first IR source, the image reflection of the at least one second IR source is visible by the camera, as a corneal reflection.

The camera may comprise a plurality of cameras.

The first IR source may comprise a plurality of first IR sources.

The at least one second IR source position may be based on a desired increase in monitored gaze range.

The at least one second IR source may be located away from the camera in the direction of the user's gaze point, at an angle relative to the camera that is smaller than the gaze angle.

The at least one second IR source may be located away from the camera in the direction of the user's gaze point, at an angle relative to the camera that is larger than the gaze angle.

The at least one of the at least one second IR source may be mounted on an object other than the eye tracker.

The object may be a display monitor.

The at least one second IR source may comprise a plurality of second IR sources.

The gaze monitoring system may further be configured to distinguish the plurality of second IR sources by at least one of: modulation of at least part of the second IR sources, selecting which second IR source is active at any given time, relative geometrical arrangement of part of the second IR sources and using IRs of different colors.

The gaze monitoring system of claim 10, further configured to select a second IR source for activation so that the reflection image is as close as possible to a desired location relative to the eye image.

The gaze monitoring system may further be configured to evaluate a gaze angle.

The gaze monitoring system may further be configured to use the plurality of second IR sources simultaneously.

The gaze monitoring system may further be configured to use the plurality of second IR sources successively.

The gaze monitoring system may further be configured to use the plurality of second IR sources both simultaneously and separately.

In a gaze monitoring system, comprising:
an eye tracker, comprising:
a camera having an optical axis;
a first IR source configured to illuminate a user's eyes, the first IR source located relatively near the optical axis; and
a second IR source configured to illuminate the user's eyes, the second IR source located relatively far from the optical axis,
a method of evaluating the desired angle and direction of the second IR source location as a function of a desired increase in a gaze angle and direction that can be monitored, comprising:
evaluating any of the difference between the desired increase in the gaze angle in a given direction and the current maximum gaze angle that can be monitored by the eye tracker in the same direction and the increased gaze angle; and
locating the second IR along the direction, at an angle based on the evaluation.

In a gaze monitoring system, comprising: an eye tracker, comprising: a camera having an optical axis; a first IR source configured to illuminate a user's eyes, the first IR source located relatively near the optical axis; and a plurality of second IR sources configured to illuminate the user's eyes, the plurality of second IR sources located relatively far from the optical axis, according to an aspect of the present invention there is provided a method of selecting a second IR to be used, comprising: determining a gaze angle of the user; for at least two IR sources calculating the angles between the gaze angle and each of the line of sight angles to the at least two IRs; and selecting, for gaze monitoring, the IR source for which the angle between the gaze angle and the line of sight angle of that IR source is the smallest.

In a gaze monitoring system, comprising: a computer and storage device configured to store data indicating which IR source should be used for a given gaze angle; an eye tracker, comprising: a camera having an optical axis; a first IR source configured to illuminate a user's eyes, the first IR source located relatively near the optical axis; and a plurality of second IR sources configured to illuminate the user's eyes, the plurality of second IR sources located relatively far from the optical axis, according to an aspect of the present invention there is provided a method of selecting a second IR to be used, comprising: calculating a gaze angle of the user; accessing the stored data for information on which IR source should be used with the gaze angle; and selecting that IR source to determine next user's gaze angle.

In a gaze monitoring system, comprising: an eye tracker, comprising: a camera having an optical axis; a first IR source configured to illuminate a user's eyes, the first IR source located relatively near the optical axis; and a plurality of second IR sources configured to illuminate the user's eyes, the plurality of second IR sources located relatively far from the optical axis, according to an aspect of the present invention there is provided a method of selecting a second IR to be used, comprising: calculating a gaze angle of the user; and selecting the IR that is the nearest to the line determined by two-times the calculated gaze angle.

In a gaze monitoring system, comprising: an eye tracker, comprising: a camera having an optical axis; a first IR source configured to illuminate a user's eyes, the first IR source located relatively near the optical axis; a first range of gaze angles that can be monitored using the first IR source; and a second range of gaze angles; according to an aspect of the present invention there is provided a method of determining the location of at least one second IR source comprising: determining a set of potential locations for the at least one second IR source, aid set of potential locations comprises at least one potential location; for each such potential location, calculating a range of gaze angles that can be monitored with a second IR source placed in this location; and selecting at least one of the at least one potential locations for which the second range of gaze angles can be monitored with the at least one second IR located in the at least one of the potential location.

The at least one of the selected locations for which the second range of gaze angles can be monitored may be prevented from being used, the method may further comprise selecting another position for which the second range of gaze angles can be monitored.

In a gaze monitoring system, comprising: an eye tracker, comprising: a camera having an optical axis; a first IR source configured to illuminate a user's eyes, the first IR source located relatively near the optical axis; and a plurality of second IR sources configured to illuminate the user's eyes; according to an aspect of the present invention there is provided a method comprising: differentiating between IRs of the plurality of second IR sources.

The differentiating may be performed by at least one of: modulation of at least part of the IRs, selecting which IR is active at any given time, relative geometrical arrangement of part of the IRs and using IRs of different colors.

only one of the first IR source and the plurality of second IR sources may be active at a given time.

The active IR may selected according to a gaze angle.

The selecting may comprise selecting the active IR so that the reflection image of the selected IR will be within the image of the cornea of the user.

The selecting may comprise selecting the active IR so that the reflection image of the selected IR will be within the image of the iris of the user.

The selecting may comprise selecting the active IR so that the reflection image of the selected IR will be within the image of the pupil of the user.

The plurality of the first IR source and the plurality of second IR sources may be active at a given time.

The IR modulation may be unsynchronized with the camera.

The IR modulation frequency may be smaller than the camera's frame rate.

The IR modulation may be synchronized with the camera.

According to an aspect of the present invention there is provided a gaze monitoring system comprising: an eye tracker comprising: a color camera having an optical axis; a first light source configured to illuminate a user's eyes, the first light source located relatively near the optical axis; and at least one second light source configured to illuminate the user's eyes, the at least one second light source having different light spectra than the first light source, the at least one second light source located relatively far from the optical axis, in a position such that when a gaze angle of the user is too large to get corneal reflection images of the first light source by the camera, the image reflection of the at least one second light source is visible by the camera, as a corneal reflection.

In a gaze monitoring system, comprising: an eye tracker, comprising: a camera having an optical axis; a first IR source configured to illuminate a user's eyes, the first IR source located relatively near the optical axis; and a plurality of second IR sources configured to illuminate the user's eyes, according to an aspect of the present invention there is provided a method of calibrating the system, comprising: guiding a user to gaze at specific calibration gaze angles; collecting images from the camera during each such gaze, the images for each such gaze comprise corneal reflection of at least one of the first IR source and the plurality of second IR sources; analyzing the images to extract relations between an image of the pupil and the reflection image of at least one of the first IR source and the plurality of second IR sources; extracting a representative relation from all these images for the calibration gaze angle; repeating step d for all the calibration gaze angles; and storing the representative relations for use as calibration data.

All of the first IR source and the plurality of second IR sources may be active during the calibration and wherein for each calibration gazing angle part or all available images of the IRs reflection images in the camera image may be detected.

For any such detected IR reflection image, calibration data may be calculated and stored.

only a subset of the first IR source and the plurality of second IR sources may be active for at least one calibration gaze angle.

For each calibration gaze angle a different IRs subset may be used.

for each calibration gaze angle the same IRs subset may be used.

The subset may comprise IRs that produce corneal reflection images in the eye tracker camera image.

The subset may be selected according to the location of the reflection images relative to each other and the location relative to the user's pupil.

The first IR source and the plurality of second IR sources may be activated successively while the user gazes at a calibration gaze angle.

The different number out of the first IR source and the plurality of second IR sources may be used for at least two different calibration angles.

The gaze calculation and IR selection may be repeated multiple times.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1A:
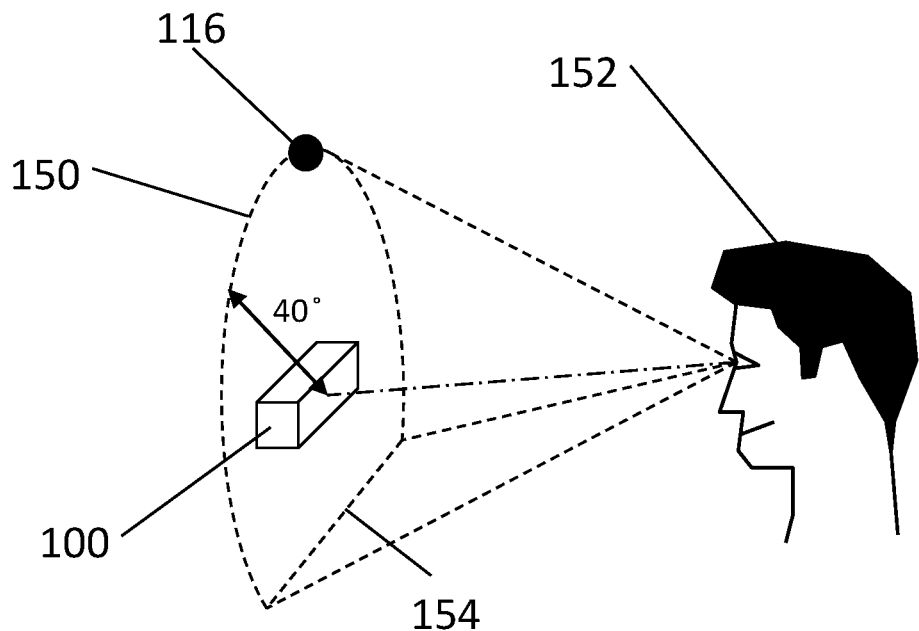
FIG. 1A illustrating the gaze angles range within which the ET can monitor the gaze direction of a user.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting the scope of the invention.

Definitions:

Angles:

Angles in this disclosure are angles in 3D space. As such they have magnitude and direction. The term angle typically refers to such an angle in a 3D space but sometimes it refers to the magnitude. This will often occur in association with the term "direction". A person skilled in the art will understand the meaning of the terms from the context.

IR:

Light source, typically in the near infrared range, but not limited to the infrared range, typically used in eye tracking to illuminate the eye of the user and provide corneal reflection image of the light source. Often light emitting diodes are used in the wavelength range of 900-1,000 nanometers.

Line of Sight:

The line passing through the center of the pupil of the user and the gaze point of the user.

Camera:

Camera indicates a typical camera of an eye tracker that is used to capture the eye image that is used to evaluate the gaze direction of the user. One such example is model UI-3360CP-NIR-GL available from IDS Imaging Development Systems GmbH, Germany.

Optical Axis:

Typically expressed also as the optical axis of the camera or the optical axis of the camera. It means any of:

an abstract line passing through the center of rotation symmetry of any element in the camera objective (or lens) and the center of the sensor of the camera and extends without limit in both directions along this line;

an abstract line that coincides with the line of theoretical rotation symmetry of the camera imaging system and extends without limit in both directions along this line; and an abstract line that coincides with the optical axis of the camera as commonly interpreted by a person with common skill in the art and extends without limit in both directions along this line.

Gaze Angle:

Any of, per the context:

In case of a single camera: The angle between the line of sight, and the line passing through the center of the pupil of the user and the center of the front surface of the camera lens.

In case of more than one camera: The angle between the line of sight and the line passing through the center of the pupil of the user and the average center location of the front surface of the cameras lenses.

Gaze Angle Direction:

The direction of the gaze angle relative to the eye tracker. For example, if the gaze point is above the eye tracker, the direction of the gaze angle is upward. If the gaze point is located to the right of the eye tracker, the direction of the gaze angle is to the right.

IR Angle:

The angle between the line passing through the IR and the center of the pupil of the user, and the line passing through the center of the pupil of the user and the center of the front surface of the camera lens.

IR angle can also be approximated as the angle between the line passing through the IR and the eyeball of the user, and the line passing through the eyeball of the user and the center of the front surface of the camera lens.

It should be appreciated that the description uses both definitions and that the difference between the angles of the two definitions is small for an ET and gaze point that are typically at least 20 cm away from the eyeball and does not limit the scope of the invention.

IR Angle Direction:

The direction of the IR angle relative to the eye tracker. For example, if the IR is located above the eye tracker, the direction of the IR angle is upward. If the IR is located to the right of the eye tracker, the direction of the IR angle is to the right.

Gaze Monitoring:

The process of capturing an image of the user's eye, analyzing the image and providing an evaluating of any of the gaze angle, gaze direction, gaze point, gaze vector or any other gaze information. Gaze monitoring and gaze tracking and similar terminologies are used as synonyms in this disclosure.

Relatively Close to the Optical Axis

Any one of:

Within the range of all gaze angles realized when a user of the eye tracker looks at any point on the eye tracker package from a location of using it for eye tracking;

Within the range of all gaze angles smaller than 15 degrees; and

Within the range of all gaze angles defining a line of sight that its distance from the camera sensor is less than 20 cm.

Relatively far from the optical axis:

Any one of:

Outside the range of all gaze angles realized when a user of the eye tracker looks at any point on the eye tracker package from a location of using it for eye tracking;

Outside the range of all gaze angles smaller than 15 degrees; and

Outside the range of all gaze angles defining a line of sight that its distance from the camera sensor is less than 20 cm.

Attention is drawn to FIG. 1A illustrating a user 152 and an eye tracker (ET) 100. Outline 150 illustrates the maximum gaze angles within which ET 100 can monitor the gaze direction of user 152. For larger angles ET 100 cannot monitor the user's gaze. Line 154 illustrated additional gaze monitoring limitation due to the upper eyelash disturbing the imaging of the pupil by the camera of the eye tracker. In this example the camera is embedded in the eye tracker (not shown). The indicator 40° indicates a typical maximum gaze angle that can be monitored. Outline 150 is the locus of all maximum angle points, in various directions, that can be monitored by eye tracker 100. The point indicated 116 is the maximum gaze angle that can be monitored that it right above eye tracker 100 camera. Eye tracker 100 camera is not shown but it can be perceived as located in the middle of eye tracker 100 with its optical axis perpendicular to the face directed at the user and located at the center of this face.

Figure 1B:
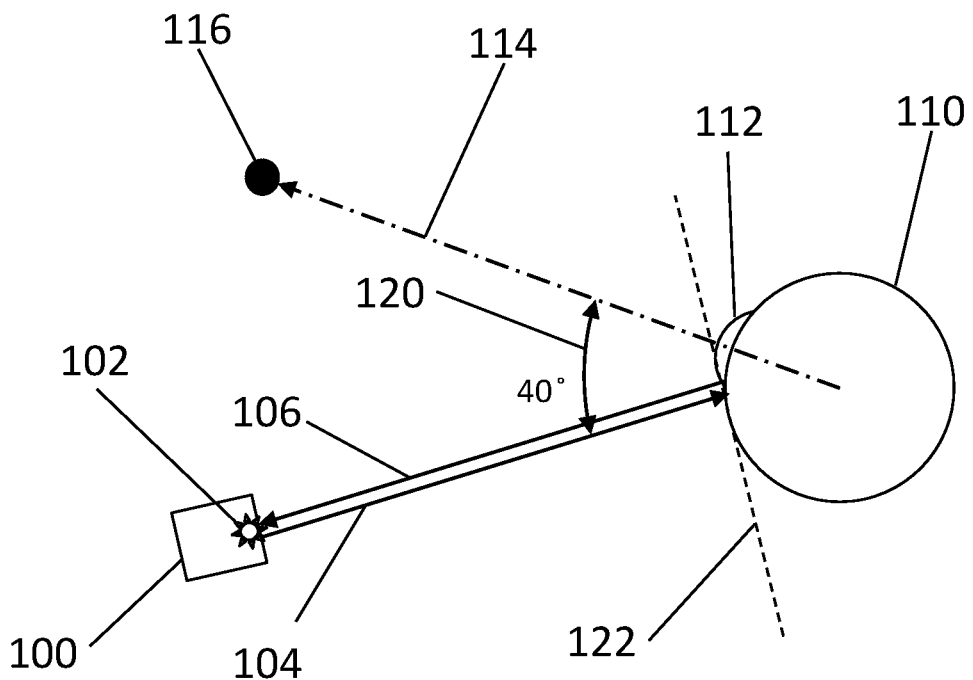
FIG. 1B is a side view of FIG. 1A with detailed eye setting illustration.

FIG. 1B is a side view of FIG. 1A that illustrates the situation where the gaze angle is at the maximum upward angle of gaze point 116 that can be monitored given the structures of the ET and the human eye.

Eyeball 110 is directed at gaze point 116. Line of sight 114 is shown and cornea 112 is shown.

ET 100 has an IR 102 illuminating eyeball 110. IR 102 is typically near the optical axis of the camera of eye tracker 100 or just far enough from the camera optical axis to provide dark pupil image if desired. Arrow 104 is a ray propagating from the ET IR 102 to eyeball 110. Ray 104 impinges on the cornea very near to the corneal limbus, the corneal border. Arrow 106 is the reflection of ray 104 from the point where the ray 104 impinges on the cornea, propagating to the ET camera (note that in FIG. 1B arrows 104 and 106 are separated for the purpose of clarity but in a more adequate geometrical optics representation these arrows would be positioned along the same line). Therefore, the camera of ET 100 captures an image of the eye with a reflection image of IR in the cornea, very near the limbus. Line 122 represents the tangent to the cornea at the centerline of the reflection image of the IR and the camera of ET 100. The angle of incidence of ray 104 to plane 122 equals the angle of reflection of ray 106 from this plane.

The gaze angle of FIG. 1B is indicated by arrow 120 and, for the purpose of explaining the invention is denotes 40 degrees.

Figure 2:
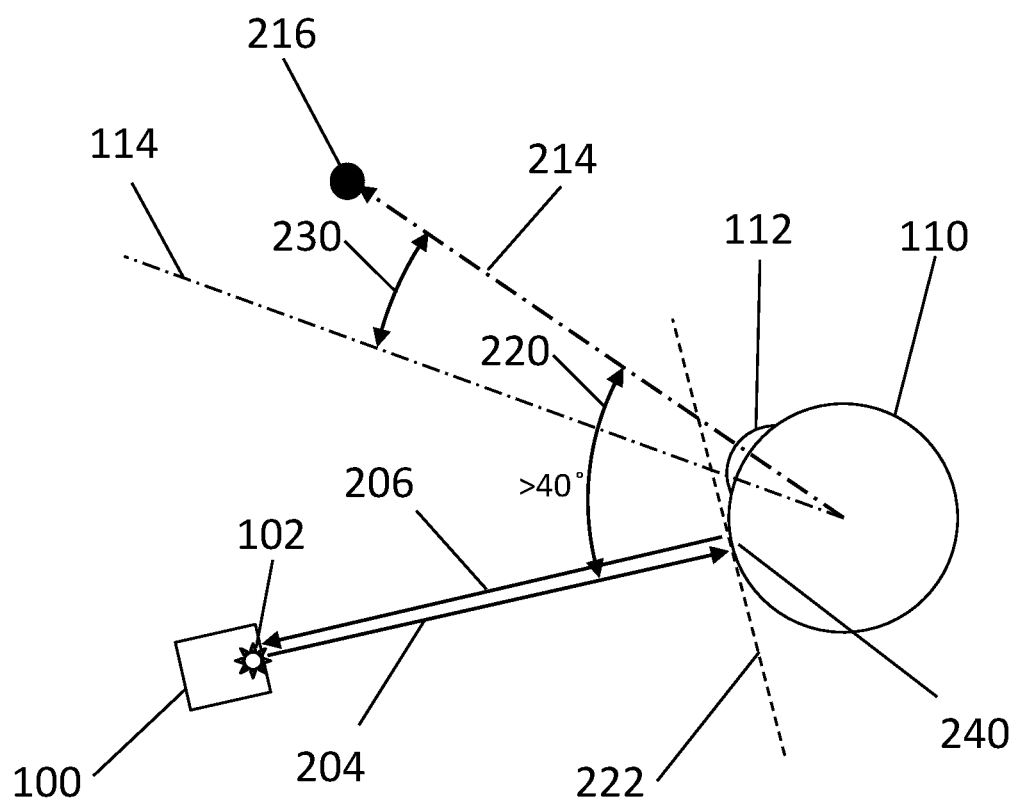
FIG. 2 illustrates a situation where the reflected image of the IR exits the cornea area and is located within the area of the sclera.

With this situation, increasing the gaze angle by looking at a gaze point which is above current gaze point 116 will require rolling eyeball 110 clockwise and, as a result, the reflected image of IR 102 will exit cornea 112 region and be located within the region of the sclera. Gaze monitoring will not be possible anymore. This situation is illustrated in FIG. 2 with a gaze angle marked as >40 degrees.

The new gaze point 216 is higher than gaze point 116 of FIG. 1B. Gaze angle 120 of FIG. 1B is increased in FIG. 2 in the amount indicated by arrow 230 (angle between the old line of sight 114 and the new line of sight 214) to result in a new gaze angle 220 between IR ray 204 and new line of sight 214.

Line 222 represents the tangent to the sclera at the point where beam 204 is reflected from the sclera as beam 206. The angle of incidence of ray 204 to plane 222 equals the angle of reflection of ray 206 from this plan. The reflection image of IR 102 will be now outside cornea 112 region and be located, in the camera image, in the sclera region (indicated 240). Due to poor image of the IR within the region of the sclera, gaze monitoring will not be possible anymore.

This situation can be resolved by providing another IR, in a location that will provide camera 100 with a reflection image of the IR that is within cornea 112 region. This is illustrated in FIG. 3.

Figure 3:
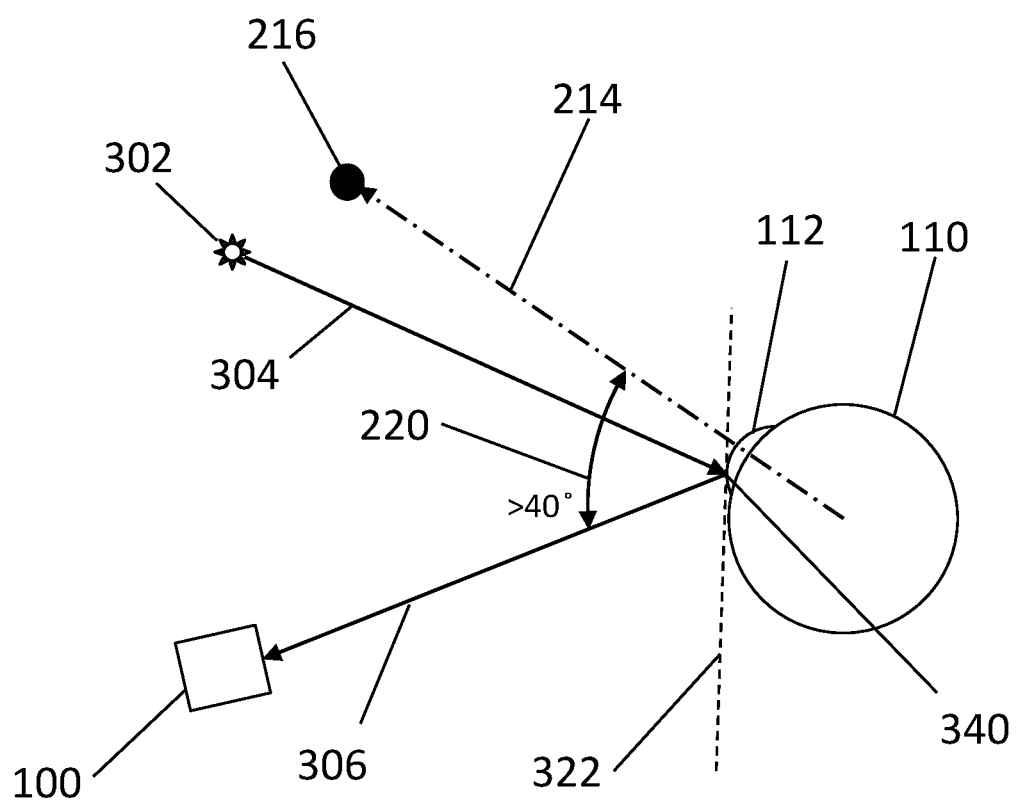
FIG. 3 illustrates resolving the situation of FIG. 2 by providing another IR.

FIG. 3 is an illustration of the settings of FIG. 2 but here IR 302 is located away from the camera in the direction of gaze point 216, still at an angle relative to camera 100 that is smaller than gaze angle 220. As a result, the IR reflection image also moves up as shown by numerical indicator 340 and will be included again inside the region of cornea 112, in the image captured by camera 100. The IR reflected image will regain a good quality and be adequate for gaze evaluation. Line 322 represents the tangent to the cornea where the angle of incidence of ray 304 from IR 302 to plane 322 equals the angle of reflection of ray 306 from plane 322 to camera 100.

Figure 4:
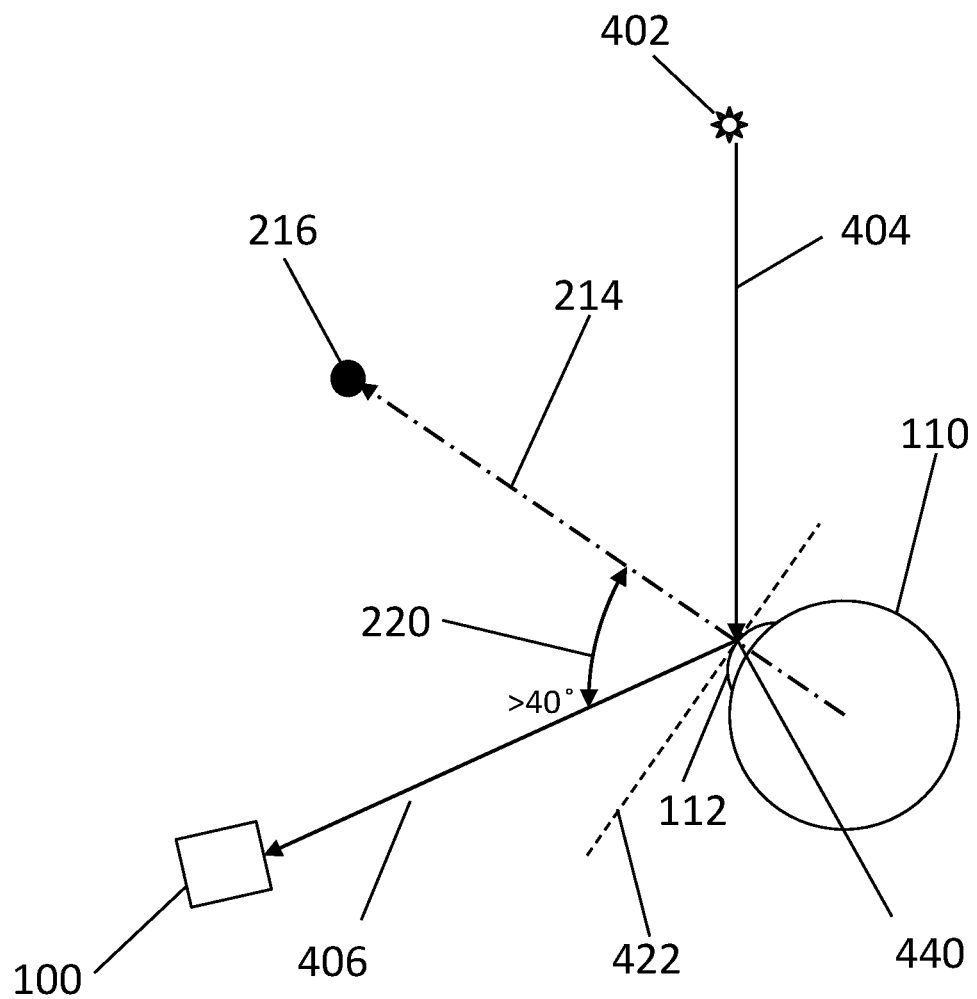
FIG. 4 illustrates another IR resolving the situation of FIG. 2, that is located at an angle, relative to the ET, that is larger than the gaze angle.

In yet another example, FIG. 4 illustrates IR 402 that is located at an angle, relative to the camera, that is larger than gaze angle 220. The new IR reflection image 440 has moved further near the center of cornea 112. Line 422 represents the tangent to the cornea where the angle of incidence of ray 404 from IR 402 to plane 422 equals the angle of reflection of ray 406 from plane 422 to camera 100.

FIGS. 3 and 4 therefore demonstrate how the limited range of monitoring gaze angle (typically 40 degrees) can be increased to enable gaze monitoring at larger gaze angles. The increased range depends on the selection of the IR position off the optical axis of the camera.

The following method is disclosed to evaluate the desired IR angle and direction as a function of the desired increase in the gaze angle and direction that can be monitored:

Denote A(0) the maximum gaze angle in a given gaze direction that can be monitored due to corneal reflection limitations (demonstrated in FIG. 1B). Denote A(1) the desired gaze angle in a given gaze direction, where A(1)>A(0).

The minimal IR angle, A(IR), to enable gaze angle of A(1) is:

$$A(IR)=(A(1)-A(0))\times 2$$

It would be appreciated that A(IR) is the minimal IR angle to enable gaze monitoring for gaze angle A(1) and larger IR angles can be used by increasing A(1).

It would be appreciated that, with the configuration of FIG. 4, where IR is positioned at a large IR angle in upward direction, some gaze angles that could be monitored with IR 102 of FIG. 1B might not be possible to monitor anymore with IR 402 of FIG. 4. This is demonstrated in FIG. 5.

Figure 5:
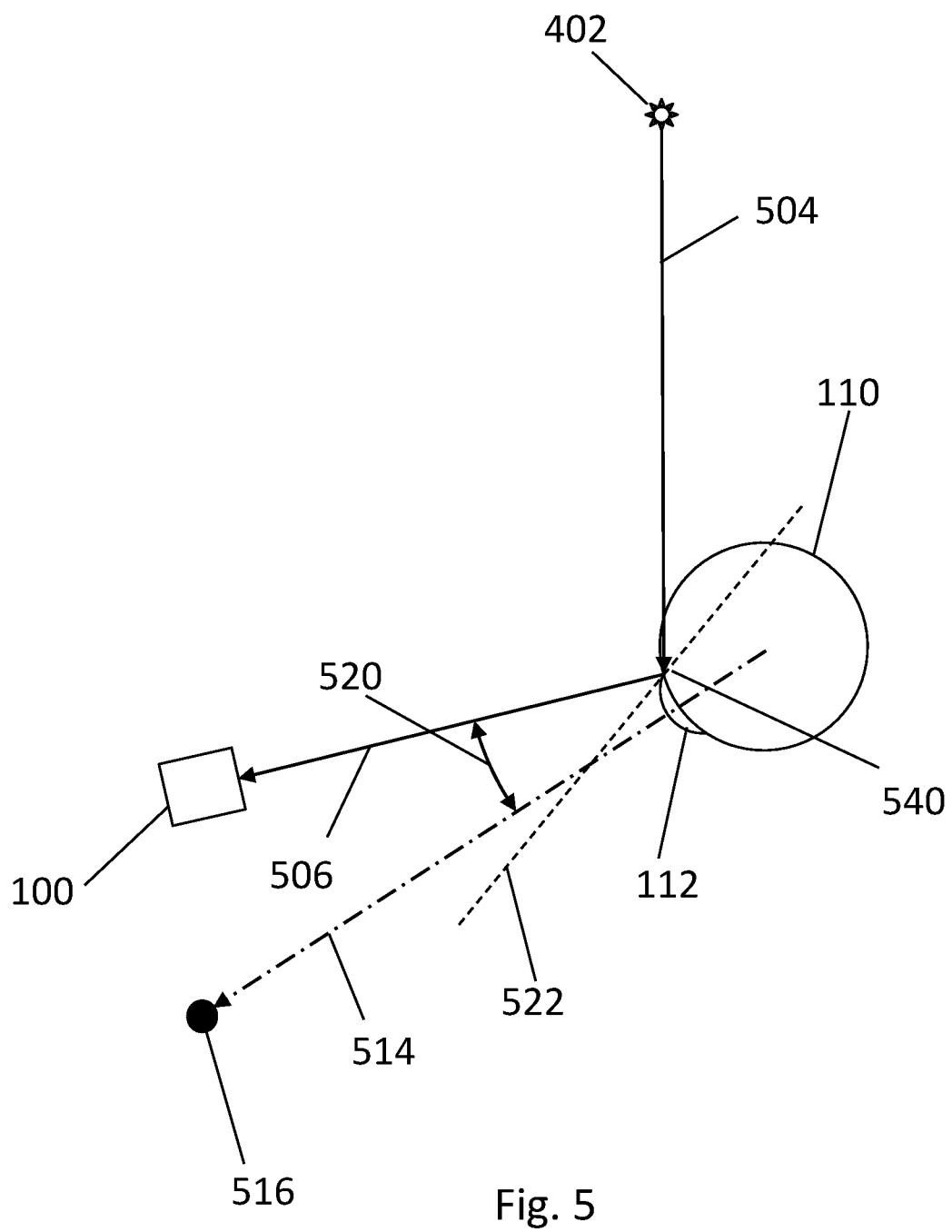
FIG. 5 illustrates a situation with a user with a gaze angle in direction below the eye tracker combined with an IR at a large angle above the ET of FIG. 4.

FIG. 5 illustrates a user with a gaze angle 520 in direction below eye tracker 100. Under these conditions cornea 112 cannot provide the camera with a reflection image of IR 402 for a number of reasons. For one reason, to provide the required angle of incidence and angle of reflection the tangent to the cornea should be at an angle shown by line 522 but no part of the cornea surface is at this angle. For another reason, the upper eyelash (not shown) would prevent any light from IR 402 impinging on cornea 112, this disables imaging of IR 402 by corneal reflection.

Figure 6:
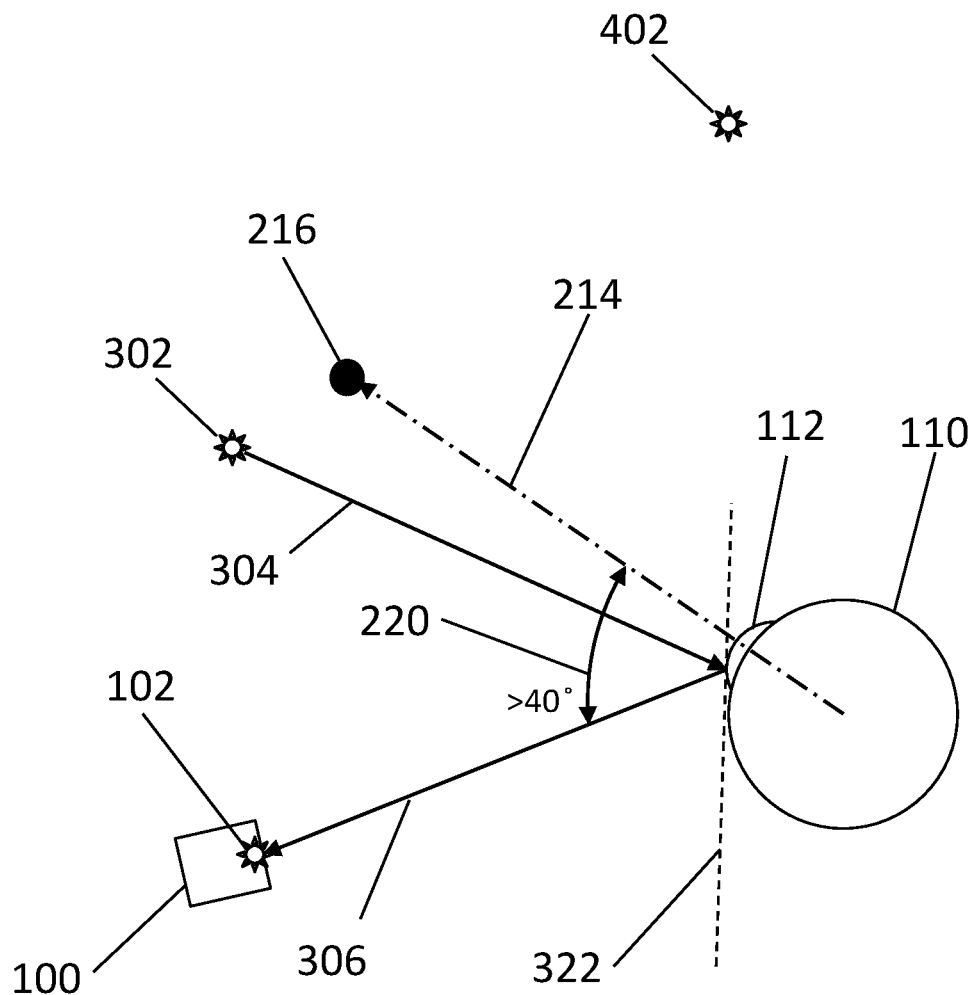
FIG. 6 illustrates the setting of FIG. 3 but with three IRs.

To enable monitoring of both large upward gaze angles such as 220 shown in FIG. 4 and downward angles such as 520 shown in FIG. 5, additional IRs can be added to the eye tracking system, as shown in FIG. 6.

FIG. 6 illustrates the setting of FIG. 3 but with two additional IRs: IR 102 of FIG. 1B and IR 402 of FIG. 4. With this arrangement, as a rule of thumb, for each gaze angles range another (at least one) IR can be used:

When the gaze angle is below eye tracker 100 or above the eye tracker but closer to the IR angle of IR 102 than to IR angle of IR 302, use IR 102 to monitor the gaze angle.

When the gaze angle is above eye tracker 100 and is closer to the IR angle of IR 302 than to IR angle of IR 102 and 402, use IR 302 to monitor the gaze angle.

When the gaze angle is above eye tracker 100 and is closer to the IR angle of IR 402 than to IR angle of IR 102 and 302, use IR 402 to monitor the gaze angle.

In a more general way one can use the rule for selecting IR to be used as follows:

Determine the gaze angle;

For at least two IRs calculate the angles between the gaze angle and each of the line of sight angles of the at least two IRs; and Select for gaze monitoring the IR for which the angle between the gaze angle and the line of sight angle of that IR is the smallest.

It would be appreciated that this evaluation and selection of IR to be used for each gaze angle can be done in advance, using for example an optical design software. Each of the ranges of gaze angle that use each IR can be recorded and stored for a later use in any form of data storage.

During usage of the eye tracker, for each gaze angle the data storage can be used to determine the IR to be used.

In another embodiment of the current disclosure, when a plurality of IRs is provided with the eye tracking system to increase the range for monitoring gaze directions, a rule for IR to use is as follows:

Get an image from the camera.

Use the image to calculate the gaze angle for this image.

For the calculated gaze angle A(2) calculate IR angle A(IR):

$$A(IR)=A(2)\times 2 \qquad (2)$$

4. Select the IR with IR angle that is the nearest to A(IR) among the different IRs.

In other words: select the IR that is the nearest to the line determined by two-times the calculated gaze angle.

It would be appreciated that the above process can be repeated with every camera image or every few camera images.

In yet another embodiment of the current disclosure, when a plurality of IRs is provided with the eye tracking system to increase the range for monitoring gaze directions, a rule for IR to use is as follows:

Get an image from the camera.

Use the image to calculate the gaze angle for this image.

Given the calculated gaze angle, select the IR with IR angle that is the nearest to the calculated gaze angle and use this IR to estimate successive gaze angles.

It would be appreciated that the above process can be repeated with every camera image or every few camera images.

In yet another example based on the configuration of FIG. 6, to find the gaze angle, capture 3 images with camera 100, wherein for each image turn on one of the 3 IRs and turn off the other two. Analyze the 3 images to select at least one image with the best IR corneal reflection (for example, the image with the corneal reflection that is the nearest in position to the center of the pupil). Use this image to estimate the gaze angle.

In another approach, out of the 3 images, one can use each image that includes a proper corneal reflection to estimate the gaze angle based on that image. Therefore, if all 3 images have proper corneal reflections, 3 evaluations of gaze angle will be made, each one based on a different IR. If only 2 images have proper corneal reflections, 2 evaluations of gaze angle will be made, each one based on a different IR.

The above approach of switching IRs while capturing successive images can be repeated for any number of IRs in any sequence that incorporates all the IRs or a part of them.

In another approach, more than one IR can be used in one image. In this example at least 2 IRs are switched ON for a given image. When the at least 2 IRs are detected in the corneal region in the image, at least a part of them can be used to estimate the gaze angle or only one can be used. Using at least 2 corneal reflections will improve the accuracy of gaze angle estimation.

When using multiple corneal reflections in a single image, identification of each IR corneal reflection (to be associated with the calibration for that IR) can be based on the geometrical layout of corneal reflections that is a reflection of the known geometrical layout of the IRs. In case of ambiguity one IR (or more) can be turned OFF between one image capture to the other image capture. Comparing these images identifies the corneal reflection of that specific IR (or IRs) and helps in identifying all the IR corneal reflections.

It would also be appreciated that calculation of gaze angle as required for the eye trackers of this disclosure is available to the public in many publications. One such publication is disclosed herein as an example, by reference: "Eye Tracking Methodology, Theory and Practice", author: Andrew Duchowski published by: Springer-Verlag, London Limited 2007, ISBN 978-1-84628-608-7.

It would be appreciated by any person of ordinary skill in the art that the above disclosure is applicable to any gaze angle direction and IR angle direction (as long as at least a part of the cornea is visible by the camera). The Figures provided are applicable to any gaze angle and gaze angle direction by assuming that the plane defined by the gaze point, the eye of the user and the camera of the eye tracker are the plane of the drawings and not necessarily show the side view of the ET.

When an eye tracker of the present disclosure is given and it is desired to increase the monitoring range of gaze angles, additional IR or IRs are required to support the additional range.

Figure 7:
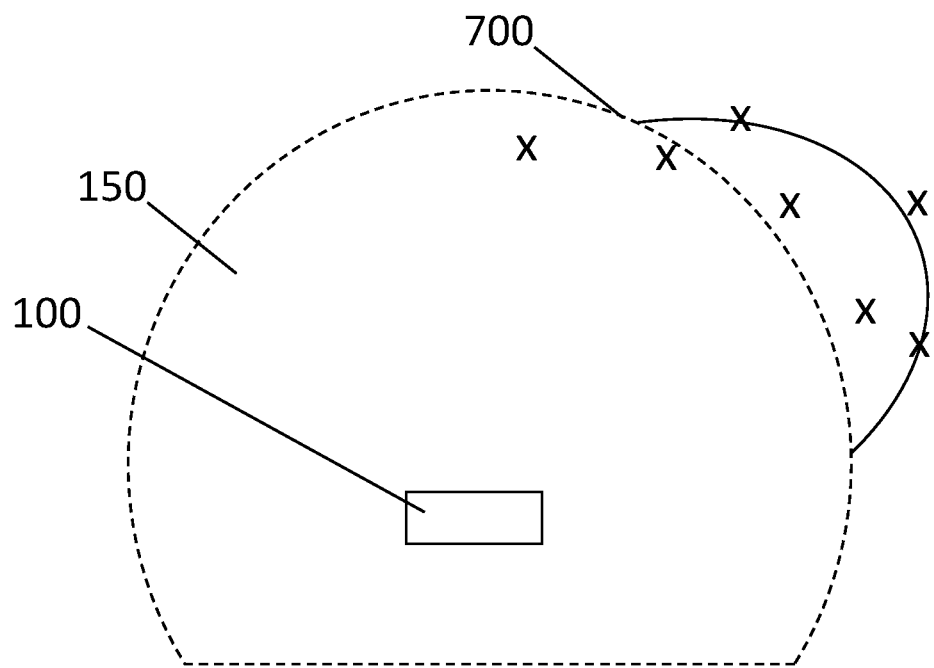
FIG. 7 illustrates an extended gaze angles range with the distribution of a number of gaze angles within or near the extended angles range.

In one aspect of the invention, to determine the location for such IRs a number of gaze angles can be distributed within and near the extended range, including on or near the border of the extended range, as illustrated in FIG. 7. Eye tracker 100 is illustrated. In this case user 152 of FIG. 1A (not shown) is located in a position outside the plane of the drawing, in direction vertical to the page plane, towards the observer of FIG. 7. Dashed outline 150 illustrates the maximum gaze angle, for each gaze direction, that can be monitored by eye tracker 100. The desired increase in the monitoring range of gaze angles is illustrated by solid line 700 that is the borderline of this desired extended range.

The specified gaze angles can be uniformly distributed in solid angles space with the vertex at the eyeball, or they can be distributed in any other method to reasonably cover the extended range. The distribution density can be as high as desired with one constrain being the calculation load and as low as desired with consideration of another constrain being the angle determined by the structure of the cornea and the eyeball, for the sake of explaining the considerations here: 40 degrees. The separation between adjacent specified gaze angles should preferably not exceed 40 degrees. In more general terms, the separation between adjacent specified gaze angles should preferably not exceed the maximum gaze angle for a system including only one IR on the optical axis, according to the gaze direction (the max gaze angle in different directions might be different, such as the direction below the eye tracker that is limited due to the upper eyelash.

An example of specific gaze angles is illustrated in FIG. 7 with the "x" indications; each such "x" indication illustrates one specific gaze angle that has been determined.

Once such a distribution of specific gaze angles has been determined, each specific gaze angle is used to calculate the possible angles and direction of angles of IR that will enable monitoring that specific gaze angle. This can be done using an optical laboratory set up or using calculation methods and tools, such as optical design software (ODS), such as OpticStudio Optical and Illumination Design Software available from Zemax LLC, Redmond, Wash., USA.

The following is an example for calculation steps using ODS:

Set up the ODS to include:

The camera of the eye tracker (sensor and lens). A pinhole camera is a simple model but it can satisfy this calculation;

At least a cornea model of the eye using specular reflection surface and positioned relative to the eye tracker in any location representing typical eye position during actual use of the eye tracker. An eyeball rotation model can also be used to provide more accurate model of the movement of the cornea while changing gaze angle but good results can be achieved with cornea model only and any nearby rotation center;

The specific gaze angles determined previously;

Select one of the specific gaze angles determined previously;

Set the cornea model to the angle of the selected specific gaze angle;

Determine a set of points along the corneal limbus or, to allow for practical tolerances, along a contour that its distance from the pupil center is smaller than the distance of the corneal limbus from the pupil center (any counter that is internal to the contour of the corneal limbus would work. A contour distance from the pupil center in the range of 0.5-2.5 mm smaller than the distance of the corneal limbus from the pupil center would serve best such tolerances). These points can be apart as desired, for example: 10-60 degrees separation can be used. These points will be called Corneal Perimeter Points (CPP);

For each CPP calculate the angle of reflection for a light ray emerging from the camera pinhole and reflected from the selected CPP;

The collection of the calculated reflected light rays determine the range in which the IR can be positioned to track the selected specified track angle;

It would be appreciated that these reflection angles can be used to generate a surface that includes these rays using any method such as linear interpolation or using a model of the eye gaze limitations such as outline 150 of FIG. 7;

Repeat steps 2-6 for all specific gaze angles;

Determining the IRs number and position:

If there is an intersection range of angles (in the mathematical sense) common to all the ranges calculated in step 6, one IR can be positioned at any angle included in this range;

If there is no intersection range of angles common to all the ranges calculated in step 6, a minimum number of partial intersections can be selected, the union (in the mathematical sense) of the selected minimum number of intersections includes angles of all the ranges calculated in step 6. One IR can be positioned at an angle included in each such partial intersection. Together these IRs will support monitoring of the determined specific gaze angles and other gaze angles that are in the area covered by the specific gaze angles.

Similarly, one can perform the following steps:

Given the first range of gaze angles that can be monitored using a first located IR near the optical axis, and given a second range of gaze angles, for example, the range bounded by solid line 700 and dashed line 150:

Determining a set of potential locations for the at least one second IR, the set of potential locations includes at least one potential location;

For each such potential location calculate the range of gaze angles that can be monitored with a second IR source placed in this location; and Select any of the at least one potential locations for which the second range of gaze angles can be monitored with the second IR located in this selected location.

Figure 8:
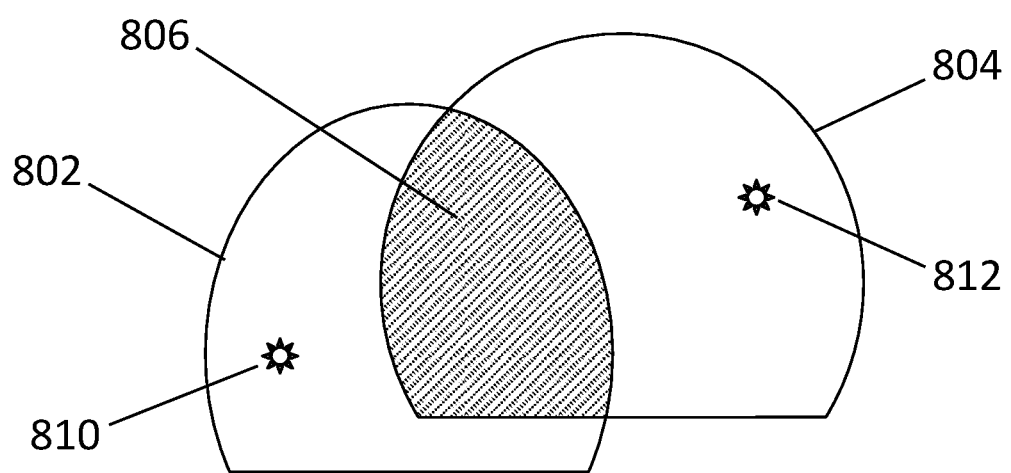
FIG. 8 illustrates two gaze angle ranges, the ET gaze monitoring at each range is enabled by at least one IR.

It would be appreciated that sometimes the above procedure results in angle ranges available for additional IRs that are inconvenient from environmental point of view. For example, an object might be present in the environment that disturbs the desired positioning of an additional IR in such a location. This is illustrated conceptually in FIG. 8. One ray reflection range of step 6 above is represented by outline 802. A second ray reflection range of step 6 above is represented by outline 804. Positioning the additional IR in the intersection range 806 will satisfy monitoring for both specific gaze points used to calculate range 802 and specific gaze points used to calculate range 804. Yet, for any reason range 806 might be undesirable for positioning an IR. In such a case two IRs can be positioned outside of range 806 such as the example of IRs 810 and 812. This way both specific gaze angles can be monitored, each one by using the associated IR. It would be appreciated that this method to overcome constrains of IR positioning can be used for any number of determined specific gaze points.

In regard to step 1.b. above, it would be appreciated that in practical use of eye trackers the eye might be in a volume range called "head box" of the eye tracker. Different locations of the eye may affect the calculation in steps 2-8. Limiting the calculation of steps 2-8 to a single location of the cornea model might render the result inaccurate, though, especially for using tolerance for the Corneal Perimeter (step 4), this in accuracy might bear no practical impact. Yet, if a higher accuracy is desired for steps 2-8, the calculation of 2-8 can be done for a plurality of locations of the cornea model in step 1.b.

Figure 9:
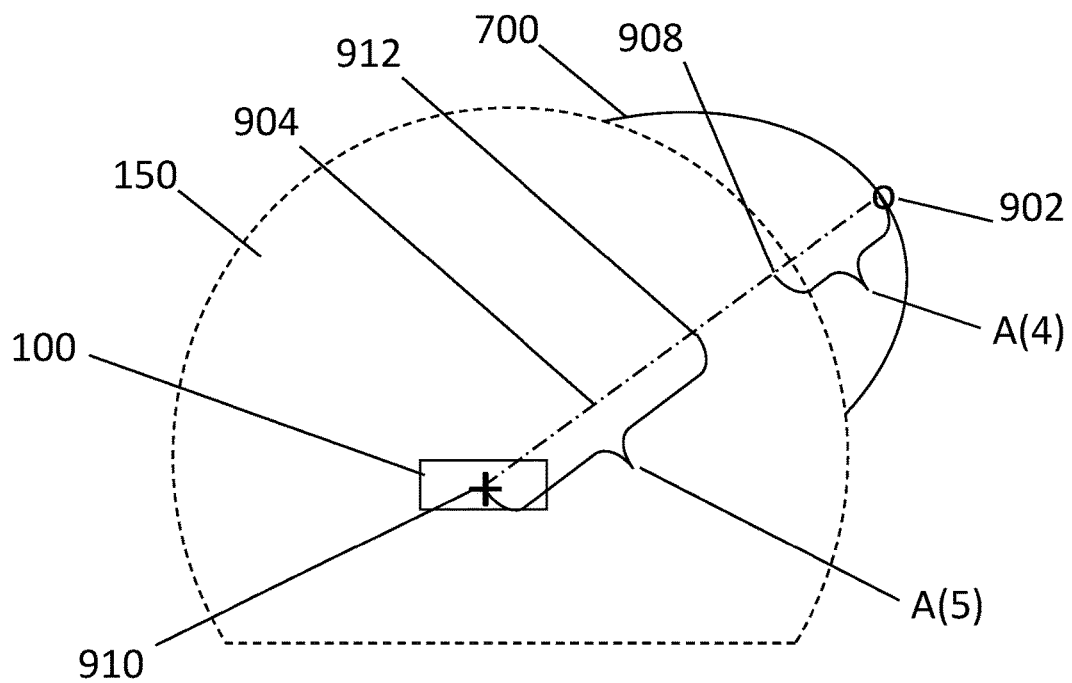
FIG. 9 illustrates IR positioning to increase monitoring range of gaze angles.

According to another example of the invention IR positioning to increase monitoring range of gaze angles is described in reference to FIG. 9. Dashed outline 150 illustrates the maximum monitored gaze angle, for each gaze direction, of eye tracker 100. The desired increase in the monitoring range of gaze angles is illustrated by solid line 700.

A first step to determine an IR angle to position additional IR would be to select a specific gaze point near borderline 700 of the extended range, preferably a location that maximizes the gaze angle as a function of the gaze direction, for gaze angles along borderline 700. In this example, the specific gaze angle is illustrated with the "o" and numerical indicator 902. Line 904 illustrates the direction of specific gaze angle 902. Line 904 starts from point 910, the center of the camera marked by "+" and passes through point 902. A(4) represents the angle with the vertex at the users' eye, with one line passing through point 902 and another line passing through point 908 (point 908 is the cross-point of outline 150 and line 904).

One example of a position for additional IR to support gaze angle 902 is near line 904 at an angle A(5), at point 912, that is at least A(4)×2 from point 910.

It would be appreciated that if it is desired to position the additional IR as near as possible to point 910, point 912 that is determined by A(5) is a good choice. Other considerations (like surrounding constrains) might make point 912 unsuitable for the positioning of the additional IR. In such a case angles larger than the angle determined by A(5) can be used and also angle directions different than that of line 904 can be used.

Figure 10:
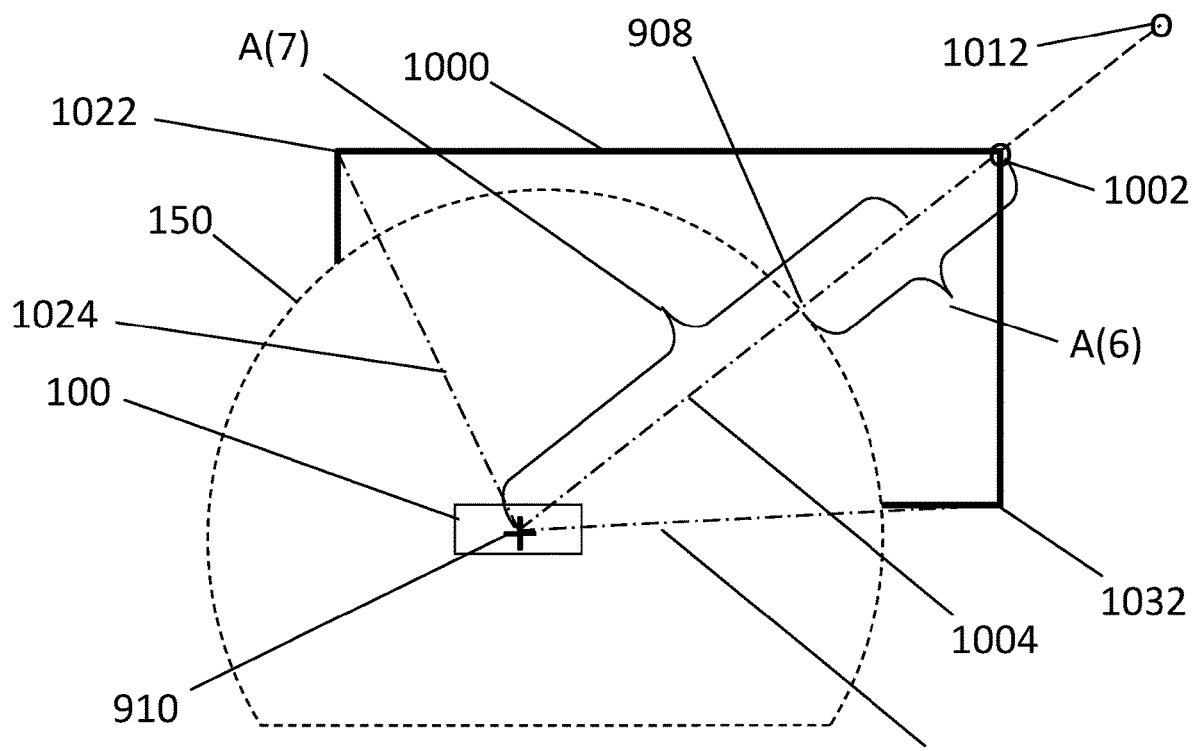
FIG. 10 is an illustration similar to that of FIG. 9 where the additional range for monitoring gaze angles represents a display at which the user looks.

FIG. 10 is an illustration similar to that of FIG. 9 where the additional range for monitoring gaze angles is illustrated by an outline 1000 that can represent a display at which the user looks.

In this example the far-most angle of a gaze point is gaze point 1002 (the far-most corner of the display). Next furthest gaze points are 1032 and then 1022. Line 1034 illustrates the direction of the angle of point 1032 and line 1024 illustrates the direction of the angle of point 1022.

In this example A(6) is associated with the angle between point 908 and point 1002. The angle associated with A(7) is the minimal angle to position an additional IR in view of gaze point 1002. With a constrain that the additional IR cannot be positioned at an angle along line 1004 that is less than the angle of point 1002 because it will disturb the visibility of display 1000, the additional IR can be positioned on the display frame near point 1002, that is a larger angle than the minimum required by A(7).

If gaze angles of points 1022 and 1032 are not covered by the IR added for gaze angle 1002, more IRs can be added along lines 1024 and 1034 using the same method as described above for gaze angle 1002.

It would be appreciated that if, for example, the angle associated with A(6) is larger than the eye tracker maximum gaze angle as indicated by 150 in FIG. 10, the minimal distance along line 1004 for placing an IR to enable monitoring of gaze point 1002 is further away in direction from point 910 to point 1002 as indicated, for illustration, by point 1012.

Figure 11:
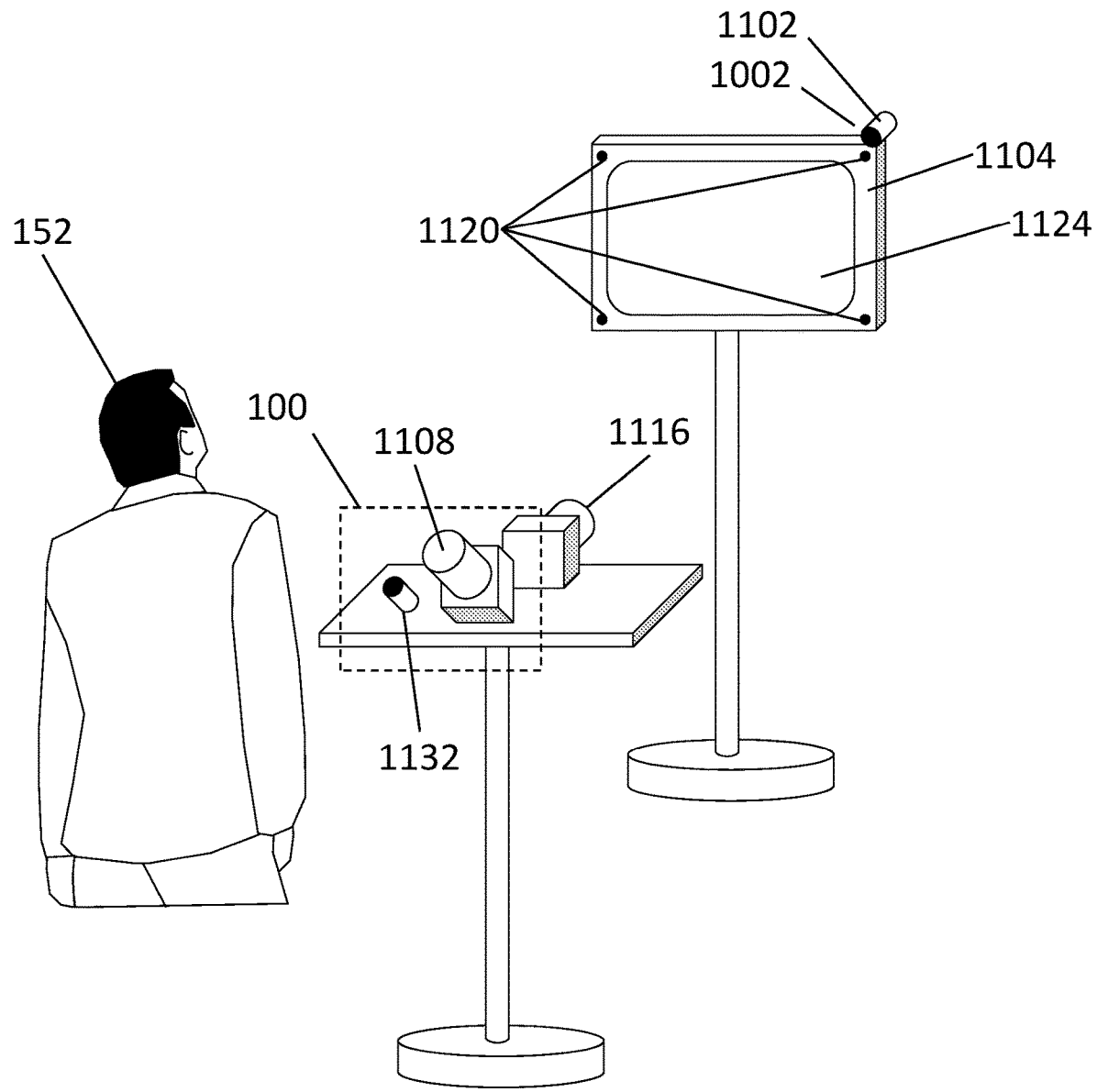
FIG. 11 illustrates an additional IR positioned on an object that can be moved, after calibration, relative to the ET.

In the example of FIG. 11 the object, in this case monitor 1104 with display area 1124 is detached from eye tracker 100, shown here schematically by dashed line 100 encapsulating eye tracker camera 1108 and eye tracker IR 1132. As explained in details in Patent Cooperation Treaty file PCT/IL2016/050308, Camera 1116 captures an image that includes at least a part of monitor 1104 and this image is processed, using for example fiducials 1120, to provide display position in a coordinate system that includes also the gaze information. Tracking point of gaze of user 152 can therefore be monitored in terms of position of the gaze point on display 1124.

In the current disclosure, also location 1002 (both in FIG. 10 and FIG. 11) is known in the coordinate system of the eye tracking system and therefore the location of additional IR 1102 is known.

If the location of IR 1102 relative to eye tracker 100 is the same as during calibration, the calibration data can be used as is to monitor the gaze of user 152 using additional IR 1102.

If IR 1102 has moved relative to eye tracker 100 between calibration and actual usage, the new location is known to the tracking system and compensation for the displacement can be made. Such compensation can use an eye optical model as described above in reference to FIG. 7.

Using the calibration data, the eye model can be positioned in each gaze angle of the calibration for IR 1102 and for each position the location, in the image of camera 1108, can be calculated for IR 1102 once when IR 1102 is in the calibration position and once when IR 1102 is in the displaced usage position. The difference between these two calculations can be used to correct the actual information calculated from camera 1108 to fit it to the calibration information or, alternatively, correct the calibration information for each gaze angle to fit the displaced corneal reflection resulting from IR 1102 displacement.

For example, let's denote, in the image from camera 1116, a vector from the center of the pupil to the image of IR 1102 during calibration, at gaze angle calibration (X1, Y1).

Following the model calculation above the calculated positions of IR 1102 image in camera 1108 image are:
  (Cx1, Cy1) for the calibration position of IR 1102; and
  (Cx2, Cy2) for the displaced position of IR 1102;
  The correction vector (Dx1, Dy1)=(Cx2−Cx1, Cy2−Cy1) can be used to correct the actual reading of camera 1108 for the displaced IR 1102 to adjust the reading to the calibration data:

(X1+Dx1,Y1+Dy1)

With this corrected data and the actual pupil center calculated from the image of camera 1108 the existing calibration data can be used.

It is appreciated that the above is calculated for gaze angles used during calibration and other angles are supported with interpolation, as common for eye tracking with non-displaced IRs.

It would also be appreciated that it is not required to use a fully featured optical design software and any minimally featured software including geometrical representation of surfaces such as the cornea and capable of basic geometrical optical calculation of reflection optics would support the above calculation.

It would be appreciated that additional IRs can be mounted on any object. For example, in reference to the set-up of FIG. 10 or FIG. 11, the additional IRs can be mounted on objects other than the monitor. Any object available that enables the mounting of the additional IRs in a location suitable for extending the gaze range as desired and described above can be used. In case such an object moves relative to the eye tracker after calibration, the feature of tracking the displacement of the additional IRs with camera 1116 should be used as described above.

In another aspect of the invention, different IRs may be distinguished by any of the modulation of at least part of the IRs or by selecting which IR is active at any given time or by relative geometrical arrangement of part of the IRs or by using IRs of different colors. In such a case the IRs might operate in the visible range using a color camera or, if these are different wavelengths in the infra-red range, a camera equipped with filters to enable the distinguishing between the different wave lengths. This can be done using known imaging technologies including such as band-pass dichroic filters or cut-on or cut-off color filters or dichroic filters.

IR modulation can be unsynchronized with camera 1108. In this example, considering a camera operative in progressive mode, it is desired that the modulation frequency will be smaller than the frame rate (frame frequency) of camera 1108. Using Nyquist Theorem as a simple criterion, the highest frequency of the IR modulation should not exceed twice the frame rate of camera 1108. Analyzing camera 1108 images, using methods known in the art (such as described in "Physically Based Rendering, From Theory to Implementation" by Matt Pharr and Greg Humphreys, ISBN-13: 978-0123750792, ISBN-10: 0123750792), can identify the modulation parameters of the analyzed IR and thereby identify the specific IR.

IR modulation can be synchronized with camera 1108 frames. In one example, the signals transferring the charges from a CCD sensor lines to the adjacent shift registers can be used to determine frame separation signal and use this as the trigger to synchronize the IR modulation. In a CMOS sensor example, the reading of a specific pixel out of the sensor can be used as a trigger for synchronizing the IR modulation. In a simplified approach, the reading of the first or last pixel of the frame can be used.

It would be appreciated that interlace mode cameras can be used in a similar way for both synchronized and unsynchronized modulation of the IRs. Assuming that typically the image of an IR spans over more than one sensor line, every field of the interlace mode will contain information of the IR image and therefore, fields of the interlaced mode can be used in the same way as frames of progressive modes.

In one example of the invention, only one IR can be active at a given time. Given the gaze direction (accurately or not), the system of the current invention can select to activate the IR that is best suited for this gaze angle. One such criterion is that the reflection image of that IR will be within the image of the cornea. Another such criterion is that the reflection image of that IR will be within the image of the iris. Another such criterion is that the reflection image of that IR will be within the image of the pupil. Preference of criterion depends on the pupil and corneal reflection image algorithms used with the system. As the system activates only one IR, no ambiguity with other IRs can occur, the location of the IR is known to the system and gaze monitoring using this IR can be performed.

In case the gaze estimation is not accurate enough and the activated IR is not detected in the image captured by the eye tracker camera 1108, the system can turn off this IR and activate another IR. This can be repeated until an IR reflection image is detected in the eye tracker camera 1108.

It would be appreciated that the above method described in reference to activating only one IR, can be used by activating simultaneously a sub-set of the available IRs. In such a case the location of the IRs reflection image in the eye tracker camera 1108 image can be used to determine which IRs these are.

Geometrical arrangements of the IRs can also be used to identify specific IR by the known geometrical arrangements. The geometrical layout of the IRs position in the eye tracker camera 1108 image, one relative to the other, can be used to identify which specific IR is each one of the reflection images. So if the IRs active at a certain moment form a known shape, such as the bottom-left, top-left and top-right corners of a rectangle, the three detected reflection images of these IRs can be analyzed for geometrical relations and thereby each IR is specifically identified.

In another aspect of geometrical identification, at least a part of the IRs can be replaced by a cluster of IRs. For example, one IR can be replaced by two nearby, horizontally arranged IRs, another IR can be replaced by two nearby, horizontally arranged IRs. Another IR can be replaced by three nearby IRs arranged at the three corners of imaginary rectangle, or arranged along a vertical line at equal distances for one arrangement and different distances from each other in another arrangement. The distances between nearby IR clusters must be large enough to make the light sources distinguishable in the eye tracker camera 1108 image but also close enough relative to the distance between the clusters to avoid confusion between clusters. If the dimension of the image of such an IR in the eye tracker camera 1108 image is n pixels, separation of 3-times to 5-times between the centers will work well with most algorithms.

In yet another aspect of the invention, IRs can be replaced with light sources of different output spectra, in the IR range or the visible range. For example, one light source can be a red LED, another amber LED, green LED and another blue LED. By using a color camera 1108, the reflection images of these LEDs in the eye tracker camera 1108 image can be distinguished based on the RGB ratio of the image of each LED.

According to yet another aspect of the invention, the calibration process of the device of the present invention is made for at least two IRs, each IR for at least part of the gaze angles for which this IR enables monitoring of the gaze angle.

A typical calibration process comprises guiding of the user to gaze at specific gaze angles and collecting images from camera 1108 during each such gaze. The images are analyzed to extract the relations between the image of the pupil and the reflection image of the IRs. A representative relation is extracted from all these images for the specific gaze angle, for all the gaze angles of the calibration. Typically a display is used to present a marker at each calibration gaze angle at which the user looks to provide the gaze at the desired angle.

In one example of the invention, all IRs can be active during the calibration and for each calibration gaze angle part or all available images of the IRs reflection images in the eye tracker camera 1108 image are detected. For each such detected IR reflection image calibration data can be calculated and stored in association to that IR reflection image. Each IR reflection image is uniquely identified using any of the methods described above. It would be appreciated that for any calibration gaze angle any one, any subgroup or all the detected IRs images can be used to calculate and store calibration data for this gaze angle and the selected IR images.

In another example of the invention, only a subset of the IRs is active for at least one calibration gaze angle. This might be useful to remove from the eye tracker camera 1108 image IRs that might confuse the algorithm used for detecting the IRs reflection images in the eye tracker camera 1108 image or confuse the algorithm used for the detection of the pupil. For each calibration gaze angle a different or the same subset can be used comparing to another calibration gaze angle. A sub group is typically selected to include IRs that produce corneal reflection images in the eye tracker camera 1108 image. Additional considerations that can improve the algorithms performance is the location of the reflection images relative to each other (to get a proper separation for the IRs reflection image detection algorithm) and the location relative to the image of the pupil to minimize interference with the pupil detection algorithm.

It would be appreciated that the case above, of activating a subset of the IRs for at least one calibration gaze angle, includes also the particular case where for each calibration gaze angle only one IR is active. Such IR can be selected optimally for the image processing algorithms as described above, to provide best conditions for both the pupil detection algorithm and the IR reflected image detection algorithm.

It would also be appreciated that, for a given calibration gaze angle operative with more than one IR, the at least two IRs can be active simultaneously and captured together in the same eye tracker camera 1108 image for analyzing calibration data for at least one of the IRs reflection images. Yet, to further support the success of the algorithms that might be confused by multiple IR images, and still calibrate the system for at least two IRs for at least one calibration gaze angle, the IRs can be activated successively while the user is gaze at the calibration gaze angle. While the user maintains his calibration gaze position, a first set of eye tracker camera 1108 images are acquired, then, without need of the user awareness, this IR is disabled, a second IR is activated and a second set of eye tracker camera 1108 images are acquired and so on, until all the IRs intended for calibration with this calibration gaze angle are used to provide a set of eye tracker camera 1108 images for that IR. Each of the sets of images can now be analyzed to extract the calibration data for the combination of that gaze angle and that IR. It would be appreciated that, for example, for 3 IRs and an eye tracker camera 1108 operative at 30 frames per second, and each set containing 10 frames, the whole process requires about 1 second. This is considerable under any time period that would annoy a user.

In yet another example, for each IR a calibration for a set of calibration points can be performed until all IRs are calibrated. First IR with a first set of calibration points, second IR with second set of calibration points and so on. The different sets of calibration points might be identical, different or partly identical and partly different.

It would be appreciated that different methods can be used for different calibration angles and different methods can be used within a single calibration gaze angle. For example, in a one calibration gaze angle a single IR can be used and in a second calibration gaze angle a subset or all IRs can be used simultaneously. In a third calibration gaze angle two IRs can be used successively and then subset of at least two IRs of the remaining IRs can be used simultaneously. Any other combination can be used to best support the usability of the calibration data, the robustness of the algorithms and minimize the calibration time.

It would be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:
1. A gaze monitoring system comprising:
   an eye tracker comprising:
      a camera having an optical axis;
      a first IR source located relatively near said optical axis of said camera;

said first IR source configured to provide a first gaze monitoring range; and
at least one second IR source;
said first and at least one second IR sources configured to illuminate at least one eye of a user;
said system configured to enable increasing said first gaze monitoring range so that for a determined gaze angle that is outside said first gaze monitoring range, a corneal reflection of said at least one second IR source is visible by said camera.

2. The gaze monitoring system of claim 1, wherein said first IR source comprises a plurality of first IR sources.

3. The gaze monitoring system of claim 1, wherein said at least one second IR source comprises a plurality of second IR sources.

4. The gaze monitoring system of claim 1, further configured to select an IR source for activation so that said corneal reflection is as close as possible to a desired location on said at least one eye.

5. The gaze monitoring system of claim 1, further configured to use at least two of the group consisting of said first and said at least one second IR sources simultaneously to evaluate gaze angle.

6. The gaze monitoring system of claim 1, further configured to use at least two of the group consisting of said first and said at least one second IR sources successively to evaluate gaze angle.

7. In a gaze monitoring system, comprising:
an eye tracker, comprising:
   a camera having an optical axis;
   a first IR source configured to illuminate at least one eye of a user, said first IR source is located relatively near said optical axis; and
   at least one second IR source configured to illuminate said at least one eye of said user, said at least one second IR source is located relatively far from said optical axis,
a method of evaluating a desired angle and direction of said at least one second IR source location as a function of a desired increase in a gaze angle and angle direction that can be monitored, comprising:
   evaluating any of a difference between said desired increase in said gaze angle in a given gaze angle direction and a current maximum gaze angle that can be monitored by said eye tracker, using said first IR source, in the same direction and said increased gaze angle; and
   locating said at least one second IR source along said direction, at an angle based on said evaluation.

8. In a gaze monitoring system, comprising:
an eye tracker, comprising:
   a camera having an optical axis;
   a first IR source configured to illuminate at least one eye of a user, said first IR source is located relatively near said optical axis; and
   at least one second IR source configured to illuminate said at least one eye of said user, said at least one second IR source is located relatively far from said optical axis;
a method of selecting an IR source to be used, comprising:
   determining a gaze angle of said user;
   for at least two of the group consisting of said first and said at least one second IR sources calculating angles between said gaze angle and each of line of sight angles to said at least two of the group consisting of said first and said at least one second IR sources; and
   selecting, for gaze monitoring, an IR source for which an angle between said gaze angle and a line of sight angle of that IR source is the smallest.

9. In a gaze monitoring system, comprising:
an eye tracker, comprising:
   a camera having an optical axis;
   a first IR source configured to illuminate at least one eye of a user, said first IR source is located relatively near said optical axis; and
   at least one second IR source configured to illuminate said at least one eye of said user, said at least one second IR source is located relatively far from said optical axis;
a method of selecting an IR source to be used, comprising:
   calculating a gaze angle of said user; and
   selecting an IR source that is the nearest to a line determined by two-times said calculated gaze angle.

* * * * *